United States Patent [19]
Boothroyd et al.

[11] Patent Number: 4,983,024
[45] Date of Patent: Jan. 8, 1991

[54] OPTICAL PHASE TO AMPLITUDE DEMODULATION

[75] Inventors: Simon A. Boothroyd, Ottawa; Jacek Chrostowski, Gloucester; Maurice S. O'Sullivan, Ottawa, all of Canada

[73] Assignee: National Research Council Canada, Ottawa, Canada

[21] Appl. No.: 417,490

[22] Filed: Oct. 5, 1989

[51] Int. Cl.$^5$ .......................... G03H 1/02; H01S 3/10
[52] U.S. Cl. ...................................... 350/354; 455/611
[58] Field of Search ................ 332/7.51; 329/144; 455/611; 350/353, 354; 372/21, 26

[56] References Cited

U.S. PATENT DOCUMENTS 4,767,195 8/1988 Pepper .................................. 372/21
4,881,788 11/1989 Doran .................................. 455/611

FOREIGN PATENT DOCUMENTS 143070 5/1985 European Pat. Off. .

OTHER PUBLICATIONS

Champagne et al., "Applications of Opt. Phase . . . Communications", Proc. SPIE, vol. 988, pp. 336-341, (Symp. 9/9/88), Abst. Herewith.
Boothroyd et al.; "Temporal Development . . . Mixing"; J. Phys. D., vol. 16, #8, pp. 465-468, 8/14/83, Abst. therewith.
Boothroyd et al.; "Two-Wave Mixing . . . Absorbers"; 8/25/88; Troy, N.Y. Mtg. of Topical Mtg Nonlineary Opt. Prop. of Mat.; Republished 4/89 in S. Opt. Soc. Am. B, Opt. Phys., vol. 6, #4, pp. 766-771, 4/89.
Piche et al.; "Conversion of Phase Mod . . . Mirror"; Opt. Comm., vol. 65, #2, pp. 146-150, 1/15/88; Abst Only Supplied Herewith.
Boothroyd, S. A.; "Interaction of Coherent Radiation . . . Media"; Dissertation, Univ. of Wales, Swensea.

*Primary Examiner*—Nelson Moskowitz

[57] ABSTRACT

A method of optical phase to amplitude demodulation comprises intersecting two mutually coherent beams of light inside a Kerr medium. One of the beams is unmodulated and the other is phase modulated. The Kerr medium is non-linear and is characterized by an equation $n = n_0 + n_2 I$, where n is the local refractive index of the medium at a point of interest, $n_0$ is the linear refractive index of the medium, $n_2$ is a nonlinear refractive index of the medium and I is the light intensity at the point of interests. An amplitude modulated output beam is generated.

6 Claims, 1 Drawing Sheet

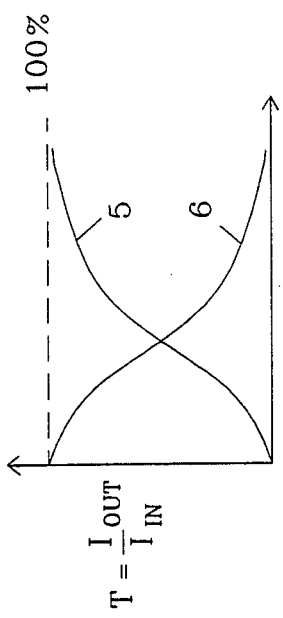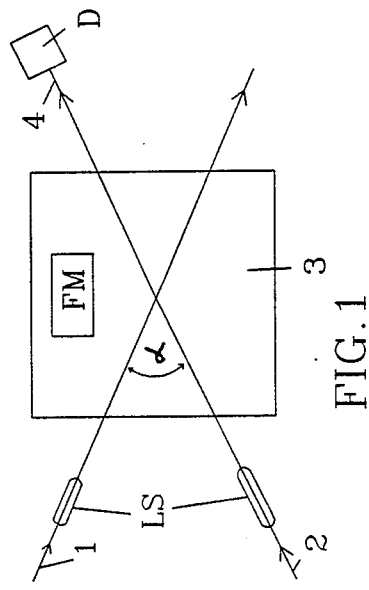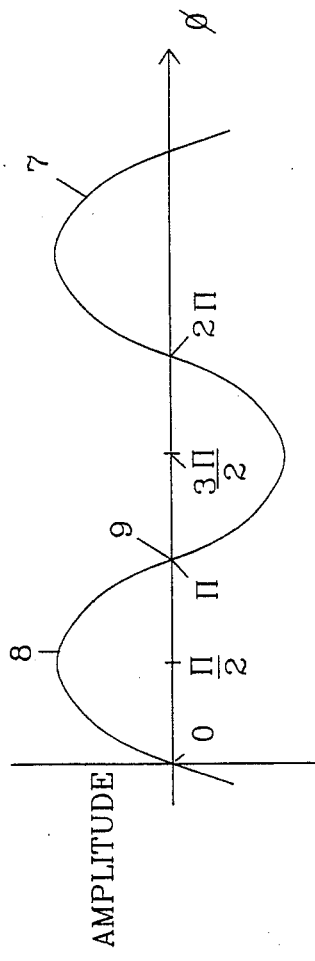

OPTICAL PHASE TO AMPLITUDE DEMODULATION

FIELD OF THE INVENTION

This invention relates to optical phase to amplitude demodulation.

BACKGROUND OF THE INVENTION

In optics, demodulation of a phase modulated beam of light can be performed by interference with a mutually coherent (well defined phase relationship), unmodulated reference beam. The output beam, a combination of the phase modulated and unmodulated beams, is passed to a detector. The phase modulation of the modulated input beam appears as an amplitude modulation of the output beam. The intensity of the output beam varies sinusoidally with the phase difference between the phase modulated beam and unmodulated beam. For small phase modulation the operating point of the demodulator is sensitive to the path difference between interfering beams. As a result, relative motion of the interfering beams will produce a phase modulation noise which cannot be distinguished from a true phase signal encoded on the beam. This is a highly undesirable result. However, through non-linear optic means, path independent or adaptive demodulation is possible, as long as the interfering beams remain mutually coherent.

PRIOR ART

Currently, photorefractors are used as a grating medium for adaptive (path independent) demodulation. See, for example, "Coherent optical detection through two-wave mixing in photorefractive materials", by F. Davidson et al published in OPTICS LETTERS, Vol. 13, No. 6, June 1988.

Photorefractive effects are non-local. As a result, when photorefractors are exposed to light, charges tend to drift apart, often under the influence of an external electric field. The resulting separation of charges produces a charge field which changes the refractive index through the linear Pockels effect.

A major disadvantage of using photorefractors, however, resides in the fact that they provide an intrinsically determined operating point, and this operating point of the demodulator is automatically set in the least sensitive part of the demodulation curve. This characteristic is undesirable and leads to poor phase to amplitude conversion.

The coupling of two electromagnetic waves in various nonlinear media is treated in a paper from the IEEE Journal of Quantum Electronics, Vol. 25, No. 3, March 1989, entitled "Two-Wave Mixing in Nonlinear Media" by Pochi Yeh. The paper discloses two types of two wave mixing; codirectional (pg. 499) and contradirectional (pg. 500). Also covered are electrostrictive Kerr effects (pg. 501) and nonlinear optical Bragg scattering (pg. 502). The paper also discloses several applications relating to two wave mixing, including: real-time holography, self-pumped phase conjugation, ring resonators, laser gyros, nonreciprocal transmission, image amplification, vibrational analysis and image processing. However, the application of optical phase to amplitude demodulation is not suggested.

SUMMARY OF THE INVENTION

The object of he present invention is to overcome the disadvantages of optical phase to amplitude demodulation in a photorefractive material, such object being achieved by using as the grating medium a non-linear Kerr medium, such as a saturable absorber, instead of a photorefractive material.

The exact meaning of the term "Kerr medium" is defined below.

By using a non-linear Kerr medium for performing optical phase to amplitude demodulation, it is possible to achieve a more desirable operating point In addition, Kerr materials have the advantages of being less expensive than photorefractors, and more amenable for use in high numerical aperture systems. Also, the Kerr medium has the additional advantage of having a coupling strength (energy transfer between the beams) that is proportional to the product of the beam intensities.

In its broad scope, the invention consists of a method of optical phase to amplitude demodulation comprising: intersecting two mutually coherent beams of light inside a Kerr medium; one of the beams being unmodulated and the other being phase modulated; the Kerr medium being non-linear and characterized by an equation $n = n_0 + n_2 I$; where n is the local refractive index of the medium at a point of interest, $n_0$ is the linear refractive index of the medium, $n_2$ is the nonlinear refractive index of the medium and I is the light intensity at said point of interest; whereby to generate an amplitude modulated output beam.

In its preferred form, the method of the invention is such that the nonlinear refractive index of the medium is characterized by $n_2 = n_2' + i n_2''$; where $n_2'$ is the dispersive component and $n_2''$ is the absorptive component; the method comprising selecting values of n' and n" to obtain a desired value of the phase angle $\phi$; where $\phi = \tan^{-1}(-n_2''/n_2')$; and where said phase angle $\phi$ determines the operating point of said demodulator.

BRIEF DESCRIPTION OF THE DRAWINGS

FIG. 1 is a schematic illustration of two wave mixing in a medium, and

FIG. 2 is a graph illustrating the relationship between transmissibility and light intensity in a Kerr medium and FIG. 3 is a sinusoidal graph representing a phase to amplitude demodulation curve.

DESCRIPTION OF A PREFERRED EMBODIMENT

Two mutually coherent beams of light, one an unmodulated reference beam 1, ad the other a phase modulated signal beam 2 are used in the demodulation process. The reference beam 1, sometimes referred to as the "pump" beam, will normally be chosen to have a substantially higher intensity than the signal beam 2. These beams pass through respective lens systems LS which cause them to intersect at an arbitrary relative angle $\alpha$ inside a Kerr medium 3. This medium is characterized by an equation $n = n_0 + n_2 I$—(1). This known equation relates the local refractive index n, to the linear refractive index $n_0$, the nonlinear refractive index $n_2$ and the local light intensity I at a point of interest. The nonlinear refractive index $n_2$ is complex, i.e. has a real and an imaginary component in an absorptive medium - characterized by the equation $n_2 = n_2' + i n_2''$—(2), where $n_2'$ is the dispersive component, $n_2''$ is the absorptive component and i signifies the imaginary term.

The light intensity I at the point of interest, i.e. the point of intersection of beams 1 and 2, is the square of the sum of the electric field amplitudes of beams 1 and 2.

It is only when $n_2$ is not equal to zero that the material is a Kerr medium. A Kerr medium can be totally non-absorptive, totally absorptive or a combination thereof. A Kerr medium is totally non-absorptive, sometimes known as a pure Kerr medium, when the imaginary component $n_2''$ is equal to zero, resulting in $n_2$ being real. When $n_2''$ is not equal to zero, the medium is sometimes known as an absorptive Kerr medium. A Kerr medium is totally absorptive when the real component $n_2'$ is equal to zero, resulting in $n_2$ being imaginary.

For the purpose of this specification, the term "Kerr medium" will be used to encompass all materials that exhibit the characterizing equations 1 and 2 discussed above with n, $n_0$ and $n_2$ never equal to zero, but with the possibility that either $n_2'$ or $n_2''$ (but not both) may be equal to zero.

The beams 1 and 2 interfere to form an intensity grating. In medium 3, a Kerr medium, this intensity grating gives rise to a refractive index grating as determined by equation (1). When two beams propagate through the grating induced by them, they undergo Bragg scattering (one beam scatters into the other and vice versa). As a result the phase modulated input beam 2 appears as an amplitude modulated output beam 4.

The characteristics of two different Kerr media are illustrated in FIG. 2. In general, light absorption in a Kerr medium varies as a function of light intensity. Curve 5 is a typical profile of a saturable absorber, i.e. an absorptive Kerr medium. As the light intensity increases, the transmissibility T, i.e. the ratio of the output intensity, $I_{out}$, to the input intensity, $I_{in}$, of the medium increases monotonically, approaching asymptotically some limit less than or equal to 100% limit, i.e. effectively becoming transparent.

Some examples of saturable absorbers are:
(i) acridine orange doped fluorophosphate glass
(ii) fluorescein doped boric acid glass
(iii) ruby.

In the above materials, for example, this characteristic is a result of three energy levels in saturable absorbers. When optical excitation occurs, atoms are excited from a ground state (level 1) to a short lived excited state (level 2), followed by a non-radiative transfer to a long lived, second excited state (level 3) - between levels 1 and 2 in energy. As the light intensity increases, more atoms are at level 3 at any given time, and therefore less light is absorbed from the ground state atoms. As a result, the material becomes more transparent.

Curve 6 is an example of the characteristics of what is known as a reverse saturable absorber, or alternatively a saturable transmitter, which can be described by equation (1) when $n_2''$ is negative. In this case the medium reduces its transmissibility T as the light intensity is increased.

A Kerr medium exhibits the Kerr effect which is local. That is the local refractive index n at any given point in the medium depends on the optical intensity I at that point with a strength that is governed by the coefficient $n_2$ (see equation 1). The medium responds to changes in intensity in a time determined by the medium response time $\tau$.

As a result of this Kerr effect, a complex index grating is formed which follows the intensity grating. In the two wave mixing process this complex grating behaves like a purely real grating which is offset in space from the intensity grating by an associated phase angle $\phi$. In this case, $\phi = \tan^{-1}(-n_2''/n_2')$___(3).

An important feature of this invention is based on being able to establish the operating point required for a specific application. The phase angle $\phi$ determines the operating point of the demodulator, i.e. the point on the sinusoidal curve 7 of FIG. 3. A good demodulator is characterized by a phase to amplitude demodulation curve 7 that responds strongly to small phase excursions of the input beam. This translates to an operating point that is on a steep portion of curve 7, e.g. point 9. A poor demodulator is characterized by a phase to amplitude demodulation curve 7 that responds weakly to a phase excursion of the input beam. This translates to an operating point that is on a flat portion of curve 7, e.g. point 8. Therefore, on curve 7 the best demodulation occurs when the operating point is in the vicinity of 0, $\pm\pi$, $\pm 2\pi, \ldots, \pm k\pi$, where k is an integer, and the worst demodulation occurs when the operating point is in the vicinity of $\pm\pi/2$, $\pm 3\pi/2,\ldots, \pm p\pi/2$, where p is an odd integer.

The phase angle $\phi$ is dependent on the values of $n_2'$ and $n_2''$ (see equation 3), which in turn depend on the absorption spectrum of the medium. Thus a desired operating point can be chosen by properly selecting a Kerr medium that gives values for $n_2'$ and $n_2''$ that correspond to a desired value of $\phi$.

For a given material the absorption spectrum and thus the values of $n_2'$ and $n_2''$, can be tailored by the choice of: temperature, pressure, applied electric, magnetic or electromagnetic field either direct or alternating, or by the influence of a third beam of laser light, shown diagrammatically in FIG. 1 as field modulation means FM. Also, a chemical reaction may be invoked to change the values of $n_2'$ and $n_2''$.

In order for the demodulator to be effective, the Kerr medium response time $\tau$ to a change in the phase of one of the two beams must be longer than the time associated with phase modulations. Also, phase excursions must be kept within $\pm 1$ radian. Anything greater will wash out the index grating. The index grating averages fast phase modulations, when appropriate time and phase conditions are met. Adaptive demodulation is obtained when $\tau$ is shorter than the times associated with undesireable phase modulation.

Light diffracts off the index grating from the reference pump beam 1 into the phase modulated beam 2 giving rise to an amplitude modulation on beam 4 which is proportional to $\sin(\phi+\Gamma)$, where $\Gamma$ is the instantaneous phase modulation on beam 2. Under ideal conditions the index grating should appear effectively stationary for one time constant $\tau$. Slow phase changes, relative to the time constant $\tau$, result in the index grating following the changes in the intensity grating. This results in poor phase to amplitude demodulation A further embodiment of this invention is an optical switch. In this application, the operating point of the demodulator is changed from a value near $\phi=0$ or $\phi=\pi$, corresponding to good demodulation, to a value near $\phi=\pi/2$ or $\phi=3\pi/2$ corresponding to poor demodulation. Therefore when the operating point is changed, as described above, the demodulation undergoes a transition from good to poor demodulation. The result is effectively an optical switch. The operating point can be changed, for example from $\phi=0$ to $\phi=\pi/2$ by the methods previously discussed, relating to changing the values of $n_2'$ and $n_2''$, which in-turn relate to the phase angle $\phi$.

The detection of a poorly demodulated output beam versus a properly demodulated output beam can be accomplished by using a detector D on output beam 4. The detector will be able to determine the state of the output beam 4, thereby defining a switch.

We claim:

1. The method of optical phase to amplitude demodulation by two wave mixing comprising:
   intersecting two mutually coherent beams of light inside a Kerr medium;
   one of said beams being unmodulated and the other being phase modulated;
   said Kerr medium being non-linear and characterized by an equation $n = n_0 + n_2 I$;
   where n is the local refractive index of the medium at a point of interest, $n_0$ is the linear refractive index of the medium, $n_2$ is the nonlinear refractive index of the medium and I is the light intensity at said point of interest;
   whereby to generate an amplitude modulated output beam; wherein;
   said nonlinear refractive index of the medium is characterized by $n_2 = n_2' + i n_2''$;
   where $n_2'$ is the dispersive component and $n_2''$ is the absorptive component;
   the method comprising selecting values of $n_2'$ and $n_2''$ to obtain a desired value of the phase angle $\phi$;
   where $\phi = \tan^{-1}(-n_2''/n_2')$;
   and where said phase angle $\phi$ determines an operating point of said demodulator.

2. The method according to claim 1 wherein
   said selected values depend on the absorption spectrum of said medium;
   the method comprising selecting said absorption spectrum and thereby said operating point, by a choice of temperature, pressure, or applied electric, magnetic or electromagnetic field either direct or alternating, or by the influence of a third beam of laser light.

3. The method according to claim 1 including
   selecting said phase angle $\phi$ to locate said operating point in the vicinity of a steep portion of a phase to amplitude demodulation curve.

4. The method according to claim 1 including
   selecting said phase angle $\phi$ to locate said operating point in the vicinity of a flat portion of a phase to amplitude demodulation curve.

5. The method according to claim 1 including
   firstly selecting said phase angle $\phi$ to locate said operating point in the vicinity of a steep portion of a phase to amplitude demodulation curve,
   and subsequently selecting said phase angle $\phi$ to locate said operating point in the vicinity of a flat portion of a phase to amplitude demodulation curve,
   whereby to provide an optical switching method.

6. The method according to claim 1 wherein
   said Kerr medium can be but is not restricted to acridine orange doped fluorophosphate glass, fluorescein doped boric acid glass or ruby.

* * * * *